United States Patent
Rooyakkers et al.

(10) Patent No.: US 11,263,355 B2
(45) Date of Patent: *Mar. 1, 2022

(54) TAMPER RESISTANT MODULE FOR INDUSTRIAL CONTROL SYSTEM

(71) Applicant: Bedrock Automation Platforms Inc., San Jose, CA (US)

(72) Inventors: Albert Rooyakkers, Sunnyvale, CA (US); Ken Doucette, Norton, MA (US)

(73) Assignee: BEDROCK AUTOMATION PLATFORMS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,120

(22) Filed: Jan. 13, 2020

(65) Prior Publication Data

US 2020/0226299 A1 Jul. 16, 2020

Related U.S. Application Data

(63) Continuation of application No. 14/918,558, filed on Oct. 20, 2015, now Pat. No. 10,534,937.

(Continued)

(51) Int. Cl.
*G06F 21/86* (2013.01)
*G06F 21/60* (2013.01)
(Continued)

(52) U.S. Cl.
CPC ............ *G06F 21/86* (2013.01); *G06F 21/604* (2013.01); *G06F 21/71* (2013.01); *H05K 5/0208* (2013.01)

(58) Field of Classification Search
CPC ........ G06F 21/86; G06F 21/604; G06F 21/71; H05K 5/0208
See application file for complete search history.

(56) References Cited

U.S. PATENT DOCUMENTS

| 4,593,384 A | * | 6/1986 | Kleijne ............... G06F 21/87 235/487 |
| 5,120,097 A | | 6/1992 | Fattori et al. |

(Continued)

FOREIGN PATENT DOCUMENTS

| JP | H05158800 A | 6/1993 |
| JP | H07219853 A | 8/1995 |

(Continued)

OTHER PUBLICATIONS

T. S. Messerges, E. A. Dabbish and R. H. Sloan, "Examining smart-card security under the threat of power analysis attacks," in IEEE Transactions on Computers, vol. 51, No. 5, pp. 541-552, May 2002. (Year: 2002).*

(Continued)

*Primary Examiner* — Kari L Schmidt
(74) *Attorney, Agent, or Firm* — Kevin E. West; Advent, LLP

(57) ABSTRACT

An industrial control system module and methods are described for self-destruction or the destruction and/or erasure of sensitive data within the industrial control system module upon an indication of an unauthorized module access event. In an implementation, a secure industrial control system module includes a circuit board including electrical circuitry; a sealed encasement that houses the circuit board, where the sealed encasement includes a housing having a first housing side and a second housing side, where the housing is configured to house the circuit board when the first housing side and the second housing side are coupled together; and a first sensor component integrated with the sealed encasement, where the first sensor component is communicably coupled to the circuit board and electrical circuitry and is configured to provide an indication of an unauthorized access event.

20 Claims, 5 Drawing Sheets

Related U.S. Application Data

(60) Provisional application No. 62/066,267, filed on Oct. 20, 2014.

(51) Int. Cl.
*G06F 21/71* (2013.01)
*H05K 5/02* (2006.01)

(56) References Cited

U.S. PATENT DOCUMENTS

| | | | |
|---|---|---|---|
| 5,159,629 A | 10/1992 | Double et al. | |
| 5,185,717 A * | 2/1993 | Mori | G06F 21/87 365/52 |
| 5,325,430 A | 6/1994 | Smyth et al. | |
| 6,292,898 B1 | 9/2001 | Sutherland | |
| 6,396,400 B1 | 5/2002 | Epstein et al. | |
| 7,015,823 B1 | 3/2006 | Gillen et al. | |
| 7,323,986 B2 | 1/2008 | Hunter et al. | |
| 7,368,935 B2 | 5/2008 | Bernier et al. | |
| 7,490,250 B2 | 2/2009 | Cromer et al. | |
| 7,495,554 B2 | 2/2009 | Heffner | |
| 7,644,290 B2 * | 1/2010 | Ransom | G01R 22/066 713/194 |
| 7,945,792 B2 | 5/2011 | Cherpantier | |
| 8,279,075 B2 | 10/2012 | Fleischman et al. | |
| 9,183,381 B2 | 11/2015 | Morris et al. | |
| 9,396,358 B1 | 7/2016 | Yap | |
| 9,575,903 B2 | 2/2017 | Glew et al. | |
| 9,715,776 B2 | 7/2017 | Conlin | |
| 2001/0056543 A1 | 12/2001 | Isomura | |
| 2004/0187035 A1 | 9/2004 | Schwan et al. | |
| 2006/0049941 A1 | 3/2006 | Hunter et al. | |
| 2006/0206714 A1 | 9/2006 | Gubo | |
| 2007/0062791 A1 | 3/2007 | Quinque et al. | |
| 2007/0157682 A1 | 7/2007 | Heffner | |
| 2007/0266447 A1 | 11/2007 | Hollander | |
| 2008/0129501 A1 | 6/2008 | Tucker et al. | |
| 2008/0132118 A1 | 6/2008 | Dalzell et al. | |
| 2009/0106563 A1 * | 4/2009 | Cherpantier | G06F 21/86 713/194 |
| 2010/0132047 A1 | 5/2010 | Rodriguez et al. | |
| 2010/0165571 A1 | 7/2010 | Everhart et al. | |
| 2012/0047374 A1 | 2/2012 | Klum et al. | |
| 2012/0185636 A1 * | 7/2012 | Leon | H01L 25/0657 711/102 |
| 2012/0298119 A1 | 11/2012 | Reese et al. | |
| 2013/0294020 A1 | 11/2013 | Rayner et al. | |
| 2013/0300453 A1 | 11/2013 | Carapelli et al. | |
| 2014/0123322 A1 | 5/2014 | Hadley | |
| 2014/0297540 A1 | 10/2014 | Swamy et al. | |

FOREIGN PATENT DOCUMENTS

| | | |
|---|---|---|
| JP | H11175406 A | 7/1999 |
| JP | 2001195307 A | 7/2001 |
| JP | 2004532490 A | 10/2004 |
| JP | 2006343844 A | 12/2006 |
| JP | 2008065401 A | 3/2008 |
| JP | 2012173905 A | 9/2012 |

OTHER PUBLICATIONS

Kgil, Taeho, Laura Falk, and Trevor Mudge. "Chiplock: support for secure microarchitectures." ACM SIGARCH Computer Architecture News 33.1 (2005): 134-143. (Year: 2005).*
Examination Report for European Application No. 15851655.9, dated Oct. 2, 2019.
Office Action for Chinese Application No. 201580062726.0, dated Feb. 25, 2020.
A. Mokari, B. Ghavami and H. Pedram, "SCAR-FPGA: A novel side-channel attack resistant fpga," 2009 5th Southern Conference on Programmable Logic (SPL), Sao Carlos, 2009, pp. 177-182. (Year: 2009).
Bouganirn, Luc, and Philippe Pucheral. "Chip-secured data access: Confidential data on untrusted servers," Proceedings of the 28th international conference on Very Large Data Bases. VLDB Endowment, 2002, pp. 131-142. (Year: 2002).
International Preliminary Report on Patentability for PCT/US2015/056538, dated Apr. 25, 2017.
International Search Report and Written Opinion for PCT/US2015/056538, dated Mar. 25, 2016.
Notice of Reasons for Rejection for Japanese Application No. 2017-521497, dated Jun. 3, 2019.
Supplementary European Search Report for European Patent Application No. EP 15851655 dated Feb. 5, 2018, 6 pages.
Office Action for Chinese Application No. 201580062726.0, dated Sep. 3, 2019.
S. Sridhar, A. Hahn and M. Govindarasu, "Cyber-Physical System Security for the Electric Power Grid," in Proceedings of the IEEE, vol. 100, No. 1, pp. 210-224, Jan. 2012. (Year: 2012).
Office Action for Chinese Application No. 201580062726.0, dated Jun. 23, 2020.
Office Action forEuropean Patent Application No. 15851655.9, dated Oct. 12, 2020.
Examination Report for European Application No. 15851655.9, dated Oct. 1, 2021.

* cited by examiner

100 INDUSTRIAL CONTROL SYSTEM MODULE

124 FIRST SENSOR COMPONENT
- 116 SWITCH TRIGGER
- 154 OPTICAL SENSOR
- 156 THERMAL SENSOR
- 158 VIBRATION SENSOR
- 160 ACCELEROMETER

132 SECOND SENSOR COMPONENT
- 116 SWITCH TRIGGER
- 154 OPTICAL SENSOR
- 156 THERMAL SENSOR
- 158 VIBRATION SENSOR
- 160 ACCELEROMETER

134 CONTROLLER

128 SECURITY MODULE

FIG. 5

TAMPER RESISTANT MODULE FOR INDUSTRIAL CONTROL SYSTEM

CROSS-REFERENCE TO RELATED APPLICATIONS

The present application is a continuation application under 35 U.S.C. § 120 of U.S. patent application Ser. No. 14/918,558, filed Oct. 20, 2015, and titled "TAMPER RESISTANT MODULE FOR INDUSTRIAL CONTROL SYSTEM," which claims the benefit under 35 U.S.C. § 119(e) of U.S. Provisional Application Ser. No. 62/066,267, filed Oct. 20, 2014, and titled "TAMPER RESISTANT MODULE FOR INDUSTRIAL CONTROL SYSTEM." U.S. patent application Ser. No. 14/918,558 and U.S. Provisional Application Ser. No. 62/066,267 are herein incorporated by reference in their respective entireties.

BACKGROUND

Computing devices are instrumental for storing, processing, and transferring large amounts of information as well as controlling automated processes. Industrial control systems (ICS), which may include process control systems (PCS), distributed control systems (DCS), programmable logic controller (PLC)-based systems, supervisory control and data acquisition (SCADA) systems, and the like, can utilize communication networks to facilitate the production of goods and provision of essential services.

SUMMARY

An industrial control system module and methods are described for self-destruction or the destruction and/or erasure of sensitive data within the industrial control system module upon an indication of an unauthorized module access event. In an implementation, a secure industrial control system module includes a circuit board including electrical circuitry; a sealed encasement that houses the circuit board, where the sealed encasement includes a housing having a first housing side and a second housing side, where the housing is configured to house the circuit board when the first housing side and the second housing side are coupled together; and a first sensor component integrated with the sealed encasement, where the first sensor component is communicably coupled to the circuit board and electrical circuitry and is configured to provide an indication of an unauthorized access event.

In an implementation, a tamper-resistant industrial control system module includes a circuit board including electrical circuitry; a connector disposed on the circuit board; a housing having a first housing side and a second housing side, where the housing is configured to house the circuit board when the first housing side and the second housing side are coupled together, and where the housing includes at least one port configured to provide external access for the connector; and an electronic switch assembly integrated with the first housing side, where the electronic switch assembly is electrically coupled to the circuit board and electrical circuitry and is configured to be triggered by a switch trigger disposed on the second housing side.

In an implementation, a method for detecting unauthorized access of an industrial control system module contained in a sealed encasement includes receiving, using a controller, an indication of an unauthorized access event of the industrial control system module from a first sensor component; and implementing a security action, using a security module, based upon the indication of the unauthorized access event of the industrial control system module.

The disclosed industrial control system module and security actions can provide a tamper-resistant module and/or a self-destructive device for preventing data and information access in the occurrence of an unauthorized module access event within an industrial control system or other electronic devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 5 is a block diagram illustrating an industrial control system module that includes at least one sensor component in accordance with example embodiments of the present disclosure.

DETAILED DESCRIPTION

Overview

Figure 1:
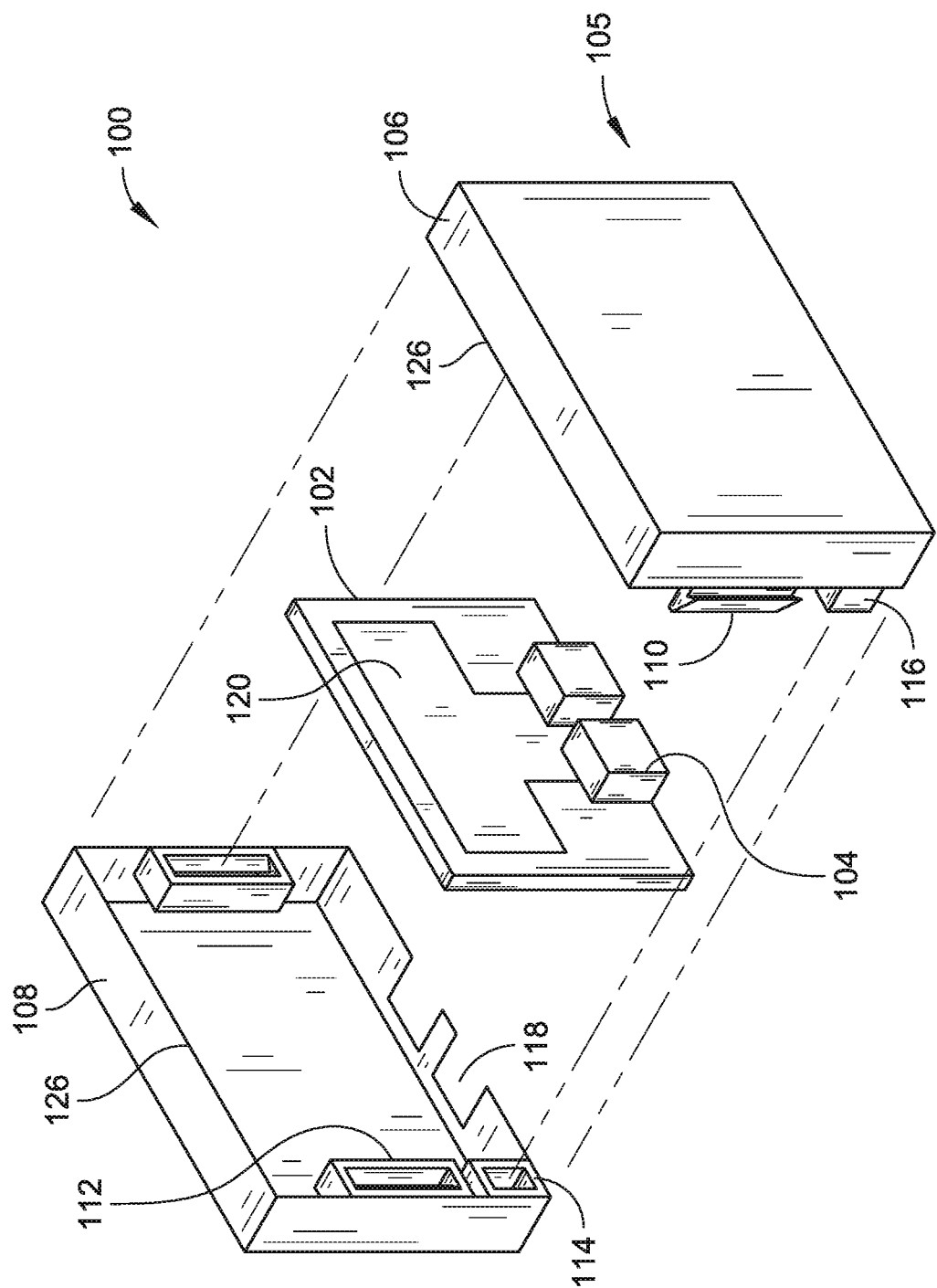
FIG. 1 is an exploded isometric view illustrating a tamper-resistant industrial control system module in accordance with an example implementation of the present disclosure.

Industrial control systems (ICS) were initially envisioned to operate in isolated and trusted domains. However, expanded connectivity technology has boosted productivity allowing for the leveraging of information from both a plant floor and from remote locations around the world, thereby leaving ICS potentially exposed to a larger number of people. Unfortunately, this expanded connectivity technology has outpaced corresponding cyber security solutions and has taxed people with the engineering understanding and security skills to keep critical systems safe from advanced cyber threats.

Data storage devices used in ICS can record and store large amounts of information, including confidential information. Some electronic data storage can require electrical power to store and retrieve the stored data. Some data storage devices are configured to include off-line or portable storage such that the device can be mobilized and used in multiple computing devices. Additional electronic devices that can include sensitive information can include computing devices such as a processor, a memory module (e.g., random-access memory (RAM), read-only memory (ROM)), a communications device, or the like. Sensitive data can be stored on these electronic data storage devices, requiring encryption and security measures.

One cyber security standard includes the 140 series of the Federal Information Processing Standards (FIPS 140) includes U.S. government computer security standards that specify requirements for cryptography modules, which are designed to keep critical systems safe. The FIPS 140 standards coordinate the requirements and standards for cryptographic modules which include both hardware and software components for use by departments and agencies of the United States federal government. Another cyber security standard includes secure session initiation protocol (SIP), which is a security mechanism defined by SIP RFC 3261 for sending SIP messages over a Transport Layer Security-encrypted channel.

However, ICS can especially be vulnerable to unauthorized access, even in light of existing security standards, such as FIP 140 or secure SIP. These industrial control systems can include sensitive and valuable information in the context of corporate espionage and technology theft. Not all electronic device and/or data storage devices include the requisite encryption or security measures adequate for preventing unauthorized access to the secure data and/or electronic device.

Accordingly, an industrial control system module and methods are described for self-destruction or the destruction and/or erasure of sensitive data within the industrial control system module upon an indication of an unauthorized module access event. In an implementation, a tamper-resistant industrial control system module includes a circuit board including electrical circuitry; a connector disposed on the circuit board; a housing having a first housing side and a second housing side, where the housing is configured to house the circuit board when the first housing side and the second housing side are coupled together, and where the housing includes at least one port configured to provide external access for the connector; and an electronic switch assembly integrated with the first housing side, where the electronic switch assembly is electrically coupled to the circuit board and electrical circuitry and is configured to be triggered by a switch trigger disposed on the second housing side.

In an implementation, a method for detecting unauthorized access of an industrial control system module contained in a sealed encasement includes receiving, using a controller, an indication of an unauthorized access event of the industrial control system module from a first sensor component; and implementing a security action, using a security module, based upon the indication of the unauthorized access event of the industrial control system module.

The disclosed industrial control system module and security actions can provide a tamper-resistant module and/or a self-destructive device for preventing data and information access in the occurrence of an unauthorized module access event within an industrial control system or other electronic devices.

Example Industrial Control System Modules

FIG. 1 illustrates an industrial control system module 100 in accordance with example implementations of the present disclosure. As shown, the industrial control system module 100 can include an electronic switch assembly 114 that is configured to provide security to the device and provide an electrical surge to the industrial control system module 100 and internal electrical circuitry 120 upon an indication of unauthorized access (e.g., physical, communicative, etc.).

As shown in FIGS. 1 through 5, an industrial control system (ICS) 101 can include at least one industrial control system module 100, which is described in accordance with example implementations of the present disclosure. The term "industrial control system" as used herein may encompass several types of control systems used in industrial production, including process control systems (PCS), supervisory control and data acquisition (SCADA) systems, distributed control systems (DCS), and other smaller control system configurations such as programmable logic controllers (PLC) often found in the industrial sectors and critical infrastructures. The industrial control system 101 may be implemented in a variety of industries, such as electrical, water, oil, gas, data, and so forth.

SCADA systems can be used with industrial processes, including manufacturing, production, power generation, fabrication, and refining. SCADA system can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

In one embodiment, an industrial control system module 100 can include a circuit board 102 having electrical circuitry 120. In some implementations, the circuit board 102 can include a printed circuit board. In other implementations, the circuit board 102 can include other circuit boards configured to support and electrically connect multiple electronic components using wiring, pads, and/or conductive tracks etched into or placed in and/or on the circuit board 102, such as a circuit card assembly and/or a backplane 150. The circuit board 102 can be single sided (e.g., the electronic components and/or electrical connections are disposed on one side of the circuit board) or can be double sided (e.g., the electronic components can be disposed on both sides of the circuit board). In a specific implementation, the circuit board 102 includes a printed circuit board having a power backplane and a communications backplane.

In implementations, the electrical circuitry 120 can include at least one electronic component that can be coupled to other components by way of the circuit board 102. Some examples of electrical circuitry 120 can include a passive component (e.g., resistor, a transistor, a capacitor, an inductor, a diode, etc.) an IC chip, a communications module (e.g., communications interface 140, an antenna, a transceiver, etc.), an I/O module 152, a memory module (e.g., memory 138), a processor 136, a connector 104, and/or a switch. Additionally, the circuit board 102 can include analog circuits, digital circuits, and/or mixed-signal circuits.

Shown in the exemplary embodiment in FIG. 1, the circuit board 102 may include and/or can be coupled to a connector 104. The connector 104 can include an electro-mechanical device for coupling electrical circuits using a mechanical assembly. In some implementations, the connector 104 can include a plug and/or a jack. In one embodiment, the connector 104 can be disposed such that the connector 104 is communicatively accessible to an external electrical device via a port 118 in the housing 105 (e.g., or sealed encasement 122). Some specific examples of a connector 104 can include a video graphics array (VGA) connector, a serial port connector, a universal serial bus (USB) connector, a coaxial connector, a DC plug connector for power, an Ethernet connector, an RJ45 connector, and/or an S-video cable connector.

The industrial control system module 100 can include a housing 105 (or encasement 122) with a first housing side 106 and a second housing side 108. In the implementation illustrated in FIG. 1, the first housing side 106 and the second housing side 108 are configured to couple with each other and form an enclosure configured to house the circuit board 102 and other components of the industrial control system module 100. The first housing side 106 and/or the second housing side 108 can include a variety of materials, such as a sturdy polymer or a plastic material that can provide support for the industrial control system module 100 and inner components (e.g., circuit board 102).

In embodiments, the first housing side 106 and/or the second housing side 108 can include means for coupling each side to the other. For example, the first housing side 106 can include a clip mechanism 110 configured to connect and securely couple to a receiver 112 disposed on and/or as a part of a second housing side 108. In this example, the clip mechanism 110 can be configured to permanently or semi-permanently couple to the receiver 112 and secure the first housing side 106 and/or the second housing side 108 together in order to prevent unauthorized access to the industrial control system module 100.

In some specific embodiments, the first housing side 106 and the second housing side 108 can be configured to be coupled together using at least one captive fastener. A captive fastener can include a fastener designed for a permanent hold within the housing (e.g., first housing side 106, second housing side 108) of the industrial control system module 100. In implementations, a captive fastener can include thread locking, press-fitting, and/or broaching for obtaining an anchor hold within the housing of the industrial control system module 100 and between the first housing side 106 and the second housing side 108. In additional implementations, a captive fastener may be melded with the material of the first housing side 106 and/or the second housing side 108 (e.g., through cold forming or welding). In one specific embodiment, the first housing side 106 and the second housing side 108 can be permanently coupled using multiple captive screws that create a permanent fit between the first housing side 106 and the second housing side 108. Additionally, the housing 105 can include an encasement seal 126, which serves to seal the internal components of the industrial control system module 100 from environmental conditions. The encasement seal 126 can be disposed on and/or between the first housing side 106 and/or the second housing side 108. In some specific implementations, the encasement seal 126 may include means for indicating an unauthorized access event. For example, the encasement seal 126 may include an electrical circuit (e.g., a wire) that, when broken or otherwise compromised, can indicated to a controller 134 that an unauthorized access event has occurred. It is contemplated that the industrial control system module 100 may be secured in other configurations. For example, the housing 105 may be formed as one unit such that access would require damaging or removing at least a portion of the structure of the housing 105.

The industrial control system module 100 can include at least one sensor component (e.g., first sensor component 124, second sensor component 132, additional sensor components, etc.) that function to indicate an unauthorized access event. For example, a first sensor component 124 can be configured to detect unauthorized access and/or an attempt at unauthorized access and communicate an indication of the unauthorized access event to a controller (e.g., controller 134, etc.), which can in turn implement a security action, described below. Some examples of sensors that may be utilized within the industrial control system module 100 can include an optical sensor (e.g., optical sensor 154), a thermal sensor (e.g., thermal sensor 156), a vibration sensor (e.g., vibration sensor 158), and/or an accelerometer (e.g., accelerometer 160).

In one specific implementation, the industrial control system module 100 can include an optical sensor 154 (e.g., a photodiode) configured to detect ambient light. In this implementation, the optical sensor 154 can detect ambient light when the housing 105 is breached in an unauthorized access attempt event and can provide an indication of the unauthorized access attempt event to controller 134. In another specific implementation, the industrial control system module 100 can include a thermal sensor 156 (e.g., a thermopile) that can detect a pre-determined amount of heat or radiation from, for example, a person as the person attempts to access and/or tamper with the industrial control system module 100. In another specific implementation, the industrial control system module 100 can include a vibration sensor (e.g., a piezo film vibration sensor) configured to detect a predetermined level of vibration, which may indicate tampering with the industrial control system module 100. In yet another specific implementation, the industrial control system module 100 can include an accelerometer configured to detect movement or repositioning of the industrial control system module 100. It is contemplated that other sensor components or combinations of sensor components may be utilized in the industrial control system module 100.

Figure 2:
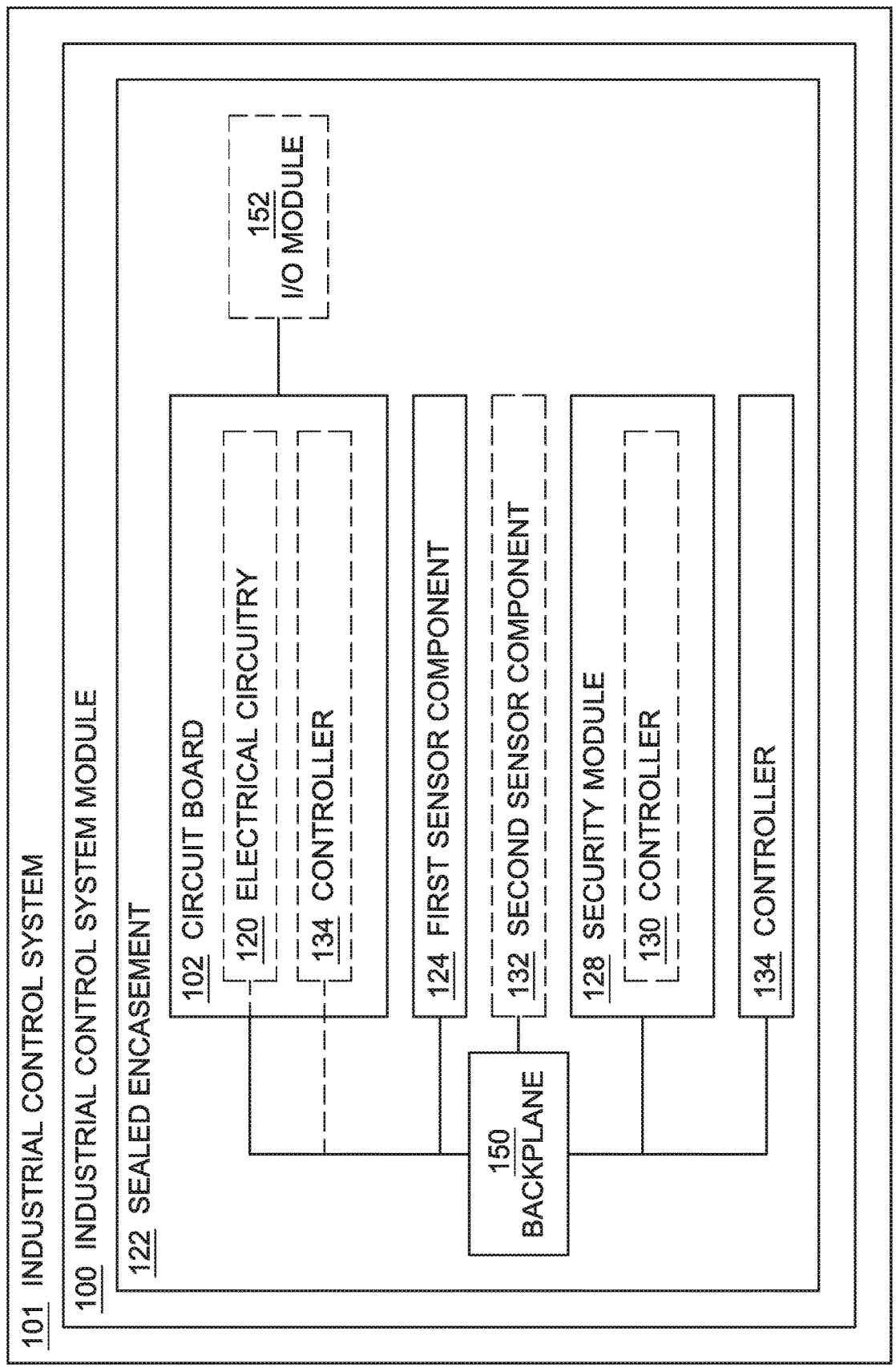
FIG. 2 is a block diagram illustrating an industrial control system that includes at least one tamper-resistant industrial control system module in accordance with example embodiments of the present disclosure.
Figure 3:
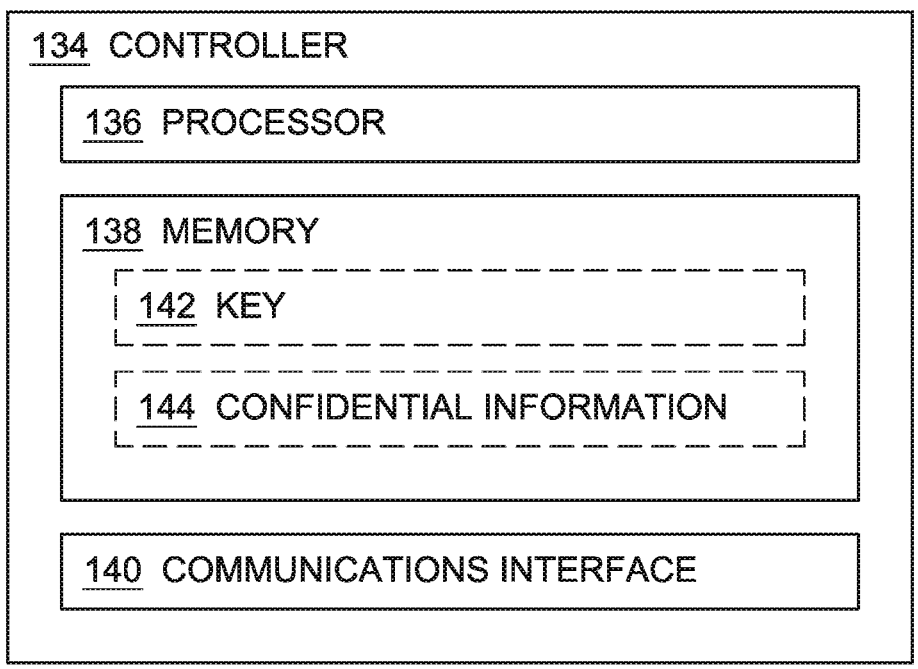
FIG. 3 is a block diagram illustrating a controller used in a tamper-resistant industrial control system module in accordance with example embodiments of the present disclosure.
Figure 4:
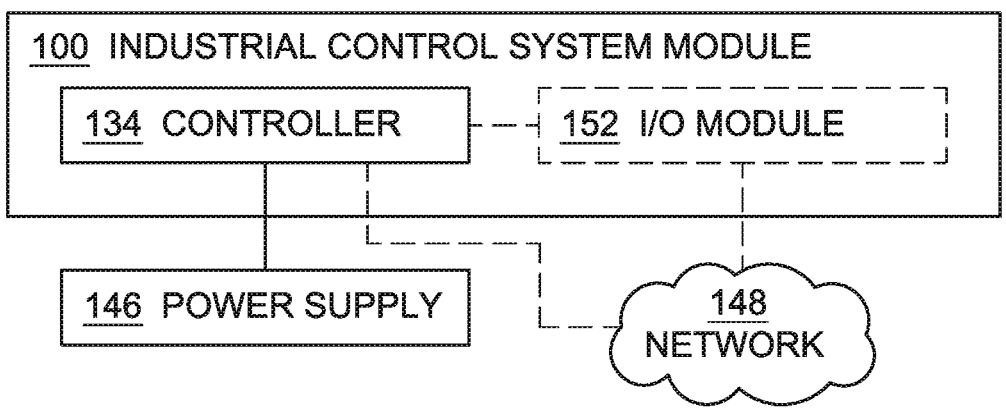
FIG. 4 is a block diagram illustrating an industrial control system environment, where the industrial control system includes a tamper-resistant industrial control system module in accordance with example embodiments of the present disclosure.

In some implementations, the industrial control system module 100 may include multiple sensor components. For example, the industrial control system module 100 can include a first sensor component 124 and a second sensor component 132. In these implementations, the additional sensor component(s) may function to verify, corroborate, or further indicate unauthorized module access. In one specific embodiment (as illustrated in FIGS. 2 and 5), the industrial control system module 100 can include an optical sensor 154 and an accelerometer 160. In this embodiment, the accelerometer 160 can detect displacement of the industrial control system module 100 and provide an indication unauthorized access to controller 134, and the optical sensor 154 can detect ambient light and provide an indication of unauthorized access and breach of the housing 105 to controller 134. When controller 134 receives the indication from the accelerometer 160 and the indication from the optical sensor 154, it may use a security module 128 to implement a security action (e.g., an electrical surge, destructive heat, an electromagnetic field) that is configured to destroy at least a portion of the industrial control system module 100 (e.g., destroy the electrical circuitry 120, melt the electrical circuitry 120, erase confidential information 144 from the memory 138, erase an encryption key 142, etc.).

In implementations, the security module 128 can include a component and/or device (which may further include a separate security controller 130 having a processor, memory, and/or communications interface) configured to receive a signal and/or instructions from the controller 134 to implement a security action. For example, when the controller 134 determines an unauthorized module access event has occurred (e.g., receiving an indication from at least one sensor component), the controller 134 can cause the security module 128 to implement a security action. Some examples of a security action can include an electrical pulse and/or surge (e.g., directed to the electrical circuitry 120, the memory 138, and/or other components within the industrial control system module 100), an excessive amount of heat (e.g., directed to the electrical circuitry 120, etc.) that is configured to melt or otherwise damage the electrical circuitry 120 and/or industrial control system module 100, exposure to an electromagnetic field sufficient to erase data from memory 138, and/or a physical shock capable of damaging the structure of at least a portion of the industrial control system module 100. In these implementations, the security action can be configured to protect an encryption key 142, confidential information 144, or other sensitive information from unauthorized access by destroying the information or disabling the industrial control system module 100 upon indication of an unauthorized module access event. Some examples of a security module 128 may include a high potential capacitor, a resistive electrical circuit configured to generate heat (or other heat producing device), a magnetic coil configured to generate an electromagnetic field, and/or a switch adapted to direct a voltage from a power module and/or power supply 146 sufficient to cause physical damage to the electrical circuitry 120, As illustrated in FIG. 1, another example of a first sensor component 124 and/or a second sensor component 132 can include an electronic switch assembly 114 and a switch trigger 116. The electronic switch assembly 114 can be disposed on the first housing side 106. The electronic switch assembly 114 can further include a mechanism (e.g., a spring-loaded button, a set of electrical contacts, a touch switch, etc.) that when tripped and/or triggered (e.g., electrically closed or opened), can transmit an electrical pulse and/or surge configured to erase and/or destroy sensitive data stored by the industrial control system module 100 and controller 134, respectively. In one specific embodiment, the electronic switch assembly 114 includes a high potential capacitor. A high potential capacitor can include a capacitor configured to store an amount of energy between multiple electrical conductors, where the amount of energy is at least sufficient to erase and/or remove data stored within the industrial control system module 100 and/or memory 138. In embodiments, the amount of energy stored in the electronic switch assembly 114 can be sufficient to destroy, disable, and/or incapacitate at least some of the electrical circuitry 120 included on the circuit board 102. In a specific embodiment, the electronic switch assembly 114, when triggered, can be configured to transmit an amount of energy configured to electrically disable associated electrical circuitry 120 disposed on the circuit board 102 and erase sensitive data stored in the industrial control system module 100.

In the embodiment illustrated in FIG. 1, the electronic switch assembly 114 can be disposed so that a switch trigger 116 is configured to couple to and/or fit with the electronic switch assembly 114 when the first housing side 106 and the second housing side 108 are coupled together. The switch trigger 116 can be disposed on and/or included as part of the second housing side 108. In one example, the switch trigger 116 can include a tab or a protrusion on the second housing side 108 such that when the second housing side 108 is coupled to the first housing side 106, the tab or protrusion fits into the electronic switch assembly 114 such that the switch is maintained in an "off" or an un-triggered position. In this example, when unauthorized access to the industrial control system module 100 is indicated (e.g., an attempt at separating the coupled first housing side 106 and the second housing side 108), the switch trigger 116 (e.g., a tab or protrusion disposed on the second housing side 108) is separated and/or removed from the electronic switch assembly 114. This separation and/or removal of the switch trigger 116 from the electronic switch assembly 114 can initiate a release of energy stored in the electronic switch assembly 114 (e.g., by triggering a high potential capacitor) to the circuit board 102 and/or the electrical circuitry 120. The energy released and transmitted to the circuit board 102 and/or the electrical circuitry 120 can overload the electrical circuitry 120, including a data storage component (e.g., memory 138), and erase data and/or destroy the electrical components of the electrical circuitry 120.

The industrial control system module 100, including some or all of its components, can operate under computer control. For example, a processor can be included with or in the industrial control system module 100 to control the components and functions of the industrial control system module 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the industrial control system module 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The industrial control system module 100 can include a controller 134 for controlling authentication operations, encryption, cryptographic communications, and so forth. The controller 134 can include a processor 136, a memory 138, and a communications interface 140. The processor 136 provides processing functionality for the controller 134 and can include any number of processors, micro-controllers, or other processing systems, and resident or external memory for storing data and other information accessed or generated by the controller 134. The processor 136 can execute one or more software programs that implement techniques described herein. The processor 136 is not limited by the materials from which it is formed or the processing mechanisms employed therein and, as such, can be implemented via semiconductor(s) and/or transistors (e.g., using electronic integrated circuit (IC) components), and so forth.

The memory 138 is an example of tangible, computer-readable storage medium that provides storage functionality to store various data associated with operation of the controller 134, such as software programs and/or code segments, or other data to instruct the processor 136, and possibly other components of the controller 134, to perform the functionality described herein. Thus, the memory 138 can store data, such as a program of instructions for operating the industrial control system module 100 (including its components), and so forth. In embodiments of the disclosure, the memory 138 can store an encryption key 142 and/or confidential information 144 for the industrial control system module 100. It should be noted that while a single memory 138 is described, a wide variety of types and combinations of memory (e.g., tangible, non-transitory memory) can be employed. The memory 138 can be integral with the processor 136, can comprise stand-alone memory, or can be a combination of both.

The memory 138 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the industrial control system module 100 and/or the memory 138 can include removable integrated circuit card (ICC) memory, such as memory provided by a subscriber identity module (SIM) card, a universal subscriber identity module (USIM) card, a universal integrated circuit card (UICC), and so on.

The communications interface 140 is operatively configured to communicate with components of the industrial control system module 100. For example, the communications interface 140 can be configured to transmit data for storage in the industrial control system module 100, retrieve data from storage in the industrial control system module 100, and so forth. The communications interface 140 is also communicatively coupled with the processor 136 to facilitate data transfer between components of the industrial control system module 100 and the processor 136 (e.g., for communicating inputs to the processor 136 received from a device communicatively coupled with the controller 134). It should be noted that while the communications interface 140 is described as a component of a controller 134, one or more components of the communications interface 140 can be implemented as external components communicatively coupled to the industrial control system module 100 via a wired and/or wireless connection. The industrial control system module 100 can also comprise and/or connect (e.g., via the communications interface 140) to one or more input/output (I/O) devices (e.g., I/O module 152), including, but not necessarily limited to: a display, a mouse, a touchpad, a keyboard, and so on.

The communications interface 140 and/or the processor 136 can be configured to communicate with a variety of different networks (e.g., network 148), including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 140 can be configured to communicate with a single network or multiple networks across different access points.

In embodiments, the control elements of the industrial control system module 100 or subsystems (e.g., the controller 134, the first sensor component 124, the second sensor component 132, the security module 128, the power supply 146, etc.) can be connected together by one or more backplanes 150. For example, as shown in FIG. 2, circuit board 102, controller 134, first sensor component 124, second sensor component 132, and/or security module 128 can be connected by a communications backplane 150. Additionally, a power supply 146 can be connected to the controller 134, the first sensor component 124, the second sensor component 132, and/or the security module 128 by a power backplane 150.

Additionally, the industrial control system module 100 may be coupled to a power module 146 (e.g., a power supply 146) within the industrial control system 101. In some implementations, the power modules 146 may include an AC-to-DC (AC/DC) converter for converting Alternating Current (AC) (e.g., as supplied by AC mains, and so forth) to Direct Current (DC). Additionally, two or more power modules 146 can be used to provide redundancy. For example, two power modules 146 can be connected to each input/output modules 152 using a separate (e.g., redundant) power backplane for each power module 146. In embodiments, the power backplane(s) 150 may be connected to one or more of the input/output modules 152 using connectors/connector assemblies.

Example Processes for Detecting Unauthorized Access in Industrial Control System(s)

Figure 6:
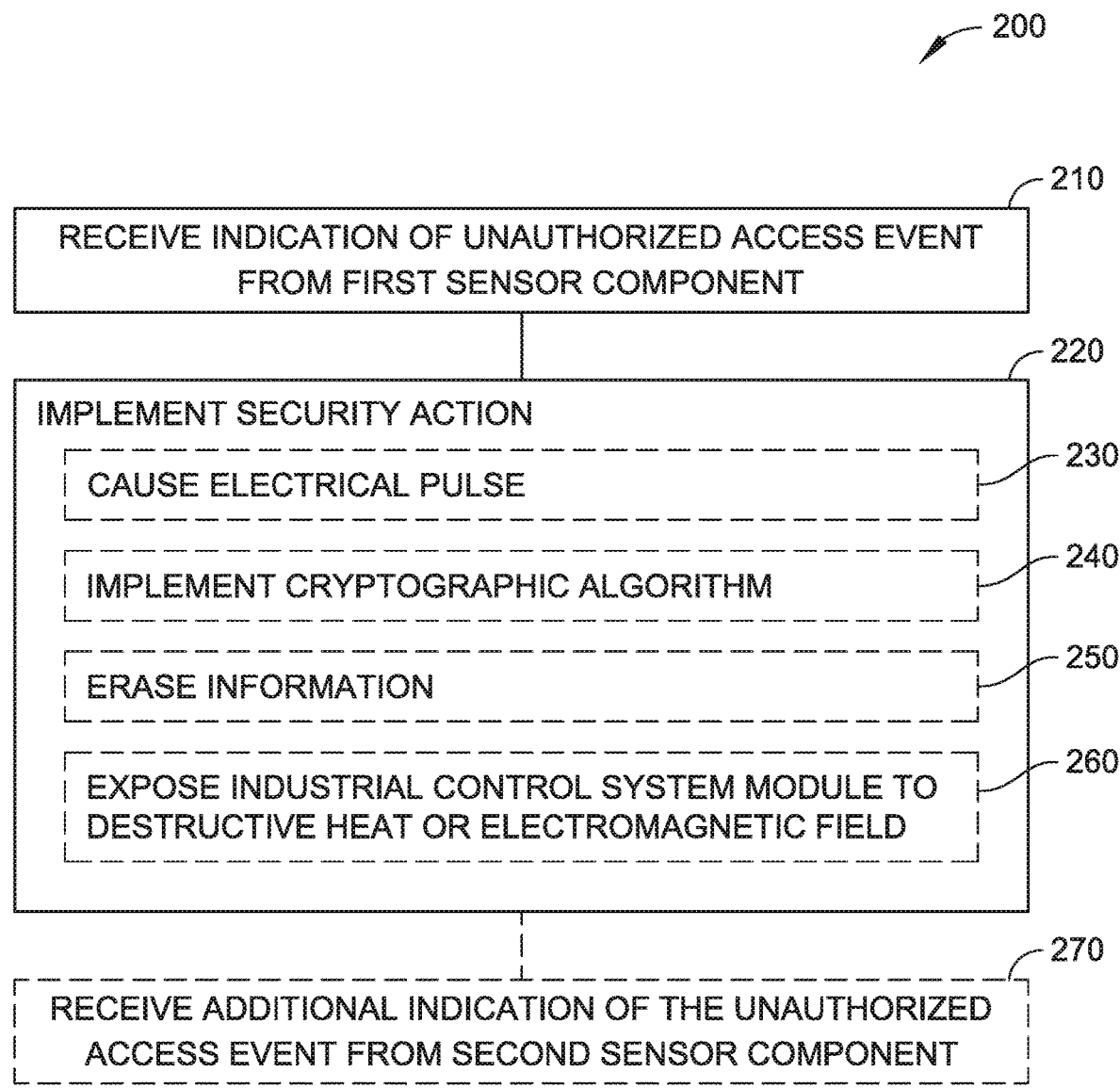
FIG. 6 is a flow diagram illustrating a method for detecting unauthorized access of an industrial control system module contained in a sealed encasement in accordance with example embodiments of the present disclosure.

FIG. 6 depicts a process 200 in accordance with example embodiments, for detecting unauthorized access of an industrial control system module contained in a sealed encasement. In implementations, the process 200 can be manifested by the industrial control system module 100 (e.g., as described with reference to FIGS. 1 through 5). An indication of an unauthorized access event of the industrial control system module from a first sensor component is received (Block 210). For example, a controller 134 is utilized to receive an indication from at least one sensor component (e.g., first sensor component 124, second sensor component 132, etc.). Each sensor component can be communicatively coupled to the controller 134. When at least one sensor component is triggered, the sensor component(s) can provide to the controller 134 the indication (e.g., signal) of the unauthorized module access event.

Then, a security action is implemented based upon the indication of the unauthorized access event of the industrial control system module (Block 220). For instance, the controller 134 can determine from at least one indication of an unauthorized module access event from at least one sensor component that the unauthorized module access event has occurred and can communicate to and/or cause the security module 128 to implement a security action. In some instances, the unauthorized module access event may include a breach of the encasement seal 126.

In a specific embodiment, the controller can determine that an unauthorized module access event has occurred based on an indication provided by a sensor component and can communicate to a security module to implement a security action including an electrical pulse (Block 230). In this embodiment, controller 134 can receive the indication from, for example, a vibration sensor 158 and cause the security module 128 (e.g., including a high potential capacitor) to direct an electrical voltage surge to the electrical circuitry 120 of the industrial control system module 100, thus destroying access to data and information within the electrical circuitry 120 (e.g., memory 138). It is contemplated that the sensor component (e.g., first sensor component 124, second sensor component 126, etc.) can include a variety of sensors, for example, an optical sensor, a thermal sensor, a vibration sensor, an accelerometer, a humidity sensor, a gas sensor, a microphone, a chemical sensor, an electricity sensor, a displacement sensor, a thermopile, a transducer, a motion sensor, etc.

In a specific embodiment, the controller can determine that an unauthorized module access event has occurred based on an indication provided by an optical sensor and can communicate to a security module to implement a security action including initiating an encryption algorithm (Block 240). In this embodiment, controller 134 can receive the indication from, for example, a thermal sensor 156 and cause the security module 128 (e.g., including a processor) to initiate an encryption algorithm within the controller 134 of the industrial control system module 100, thus encrypting data and information within the electrical circuitry 120 (e.g., memory 138).

In a specific embodiment, the controller can determine that an unauthorized module access event has occurred based on an indication provided by an optical sensor and can communicate to a security module to implement a security action including erasing memory (Block 250). In this embodiment, controller 134 can receive the indication of the unauthorized module access event from, for example, an accelerometer 160 and cause the security module 128 (e.g., including a processor) to delete and/or erase data and/or information (e.g., an encryption key 142, confidential information 144, etc.) from the memory 138 within the controller 134 of the industrial control system module 100, thus preventing access to the data and/or information.

In a specific embodiment, the controller can determine that an unauthorized module access event has occurred based on an indication provided by an optical sensor and can communicate to a security module to implement a security action including exposing the industrial control system module to at least one of destructive heat or a destructive electromagnetic field (Block 260). In this embodiment, controller 134 can receive the indication of the unauthorized module access event from, for example, an optical sensor 154 and a vibration sensor 158 and cause the security module 128 (e.g., including a processor) to generate a destructive amount of heat (e.g., sufficient to melt and/or damage at least a portion of the controller 134, memory 138, and/or industrial control system module 100) and direct the heat to the data and/or information containing portion(s) of the industrial control system module 100 (e.g., memory 138), thus preventing access to the data and/or information. Additionally, the security module 128 may generate other destructive forces, such as an electromagnetic field generated by security module 128 including an electromagnetic device, that are configured to destroy at least a portion of the memory 138, controller 134, and/or industrial control system module 100.

In an embodiment, an additional indication of the unauthorized access event may be received from a second sensor component (Block 270). In this embodiment, a second sensor component 126 can provide the indication to controller 134 in addition to an indication from a first sensor component 124. Providing an additional indication of unauthorized access from a second sensor component 126 (or third sensor component, fourth sensor component, and so forth) can serve to improve the accuracy of unauthorized module access detection and can serve to minimize false event triggers and indications.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A secure industrial control system module, comprising:
   a circuit board, the circuit board including a power backplane and a communications backplane;
   a housing that houses the circuit board, where the housing includes a first housing side and a second housing side;
   an encasement seal disposed at least one of on or between the first housing side and the second housing side, the encasement seal comprising an electrical circuit, the electrical circuit configured to indicate an unauthorized access event, when compromised;
   an electronic switch assembly comprising a high potential capacitor configured to store an amount of energy sufficient to erase data within the industrial control system module;
   a switch trigger coupled with the electronic switch assembly, wherein the separation of the switch trigger from the electronic switch assembly indicates the unauthorized access event;
   a first sensor component communicatively coupled to the circuit board and electrical circuitry, the first sensor component configured to provide an indication of the unauthorized access event, the first sensor component comprising the electronic switch assembly and the switch trigger; and
   a controller configured to implement a security action configured to: initiate an encryption algorithm to encrypt data and information within the industrial control system module, and destroy at least a portion of the secure industrial control system module, based at least in part on the indication of the unauthorized access event, wherein destroying at least a portion of the secure industrial control system module comprises activating the high potential capacitor to erase data within the electrical circuitry.

2. The secure industrial control system module of claim 1, wherein the electrical circuitry includes at least one of a communication module, a power module, a physical interconnect device, a controller, a memory, or a processor.

3. The secure industrial control system module of claim 1, wherein the first sensor component includes at least one of an optical sensor, a thermal sensor, a vibration sensor, a sound sensor, an accelerometer, or a physical sensor.

4. The secure industrial control system module of claim 1, wherein the unauthorized access event includes breaching an encasement seal.

5. The secure industrial control system module of claim 1, further comprising:
   a security controller configured to implement a security action based on the indication of an unauthorized access event.

6. The secure industrial control system module of claim 5, wherein the security controller includes a second controller coupled to at least one of a high potential capacitor or a power supply.

7. The secure industrial control system module of claim 5, wherein the security action includes an electrical shock event.

8. The secure industrial control system module of claim 5, wherein the security action includes an information erasing event.

9. The secure industrial control system module of claim 1, further comprising:
   a second sensor component communicatively coupled to the circuit board and electrical circuitry, the second sensor component configured to verify the indication of the unauthorized access event prior to implementing the security action.

10. A tamper-resistant industrial control system module, comprising:
- a circuit board including electrical circuitry, a power backplane, and a communications backplane;
- a connector disposed on the circuit board;
- a housing having a first housing side and a second housing side, where the housing is configured to house the circuit board, and where the housing includes at least one port configured to provide external access for the connector;
- an encasement seal disposed on and/or between the first housing side and the second housing side, the encasement seal comprising an electrical circuit, the electrical circuit configured to indicate an unauthorized access event, when compromised;
- an electronic switch assembly including a high potential capacitor configured to store an amount of energy sufficient to erase data within the electrical circuitry, the electronic switch assembly integrated with the first housing side, where the electronic switch assembly is electrically coupled to the circuit board and electrical circuitry;
- a switch trigger coupled with the electronic switch assembly, wherein the separation of the switch trigger from the electronic switch assembly indicates the unauthorized access event; and
- a first sensor component communicatively coupled to the circuit board and electrical circuitry, the first sensor component configured to provide indication of the unauthorized access event, the first sensor component comprising the electronic switch assembly and the switch trigger; and
- a controller configured to implement a security action configured to: initiate an encryption algorithm to encrypt data and information within the industrial control system module, and destroy at least a portion of the secure industrial control system module, based at least in part on the indication of the unauthorized access event, wherein destroying at least a portion of the secure industrial control system module comprises activating the high potential capacitor to erase data within the electrical circuitry.

11. The industrial control system module of claim 10, wherein the housing includes at least one captive fastener.

12. A method for detecting unauthorized access of an industrial control system module contained in a sealed encasement, comprising:
- triggering, using a controller, a first sensor component of the industrial control system module;
- receiving, using the controller, an indication of an unauthorized access event of the industrial control system module from the first sensor component of the industrial control system module; and
- implementing, using the controller, a security action based at least in part on the indication of the unauthorized access event, the security action comprising:
  - initiating an encryption algorithm to encrypt data and information within the industrial control system module; and
  - activating a high potential capacitor coupled with an electronic switch assembly, the high potential capacitor storing an amount of energy sufficient to destroy at least a portion of the industrial control system module by erasing data within the electrical circuitry of the industrial control system module.

13. The method for detecting unauthorized access of the industrial control system module contained in the encasement of claim 12, further comprising:
- receiving, using a controller, a verification of the unauthorized access event of the industrial control system module from a second sensor component of the industrial control system module prior to implementing the security action.

14. The method for detecting unauthorized access of the industrial control system module contained in the encasement of claim 12, wherein the unauthorized access event includes breaching an encasement seal.

15. The method for detecting unauthorized access of the industrial control system module contained in the encasement of claim 12, wherein the first sensor component includes at least one of a light sensor, a thermal sensor, a vibration sensor, or a motion sensor.

16. The method for detecting unauthorized access of the industrial control system module contained in the encasement of claim 12, wherein implementing the security action includes causing an electrical surge event to occur.

17. The method for detecting unauthorized access of the industrial control system module contained in the encasement of claim 12, wherein implementing the security action includes implementing an encryption algorithm.

18. The method for detecting unauthorized access of the industrial control system module contained in the encasement of claim 12, wherein implementing the security action includes erasing information.

19. The method for detecting unauthorized access of the industrial control system module contained in the encasement of claim 12, wherein implementing the security action includes exposing the industrial control system module to at least one of destructive heat or a destructive electromagnetic field.

20. The method for detecting unauthorized access of the industrial control system module contained in the encasement of claim 12, further comprising:
- receiving an additional indication of the unauthorized access event of the industrial control system module from a second sensor component.

* * * * *